Jan. 28, 1969  H. H. KLUG  3,425,015

MAGNETICALLY COUPLED CORE AND COIL HAVING RELATIVE MOVEMENT

Filed April 1, 1966  Sheet 1 of 2

INVENTOR
HERBERT H. KLUG
by JEFFERS & YOUNG
ATTORNEYS

INVENTOR
HERBERT H. KLUG
by JEFFERS & YOUNG
ATTORNEYS

United States Patent Office 3,425,015
Patented Jan. 28, 1969

3,425,015
MAGNETICALLY COUPLED CORE AND COIL HAVING RELATIVE MOVEMENT
Herbert H. Klug, Fort Wayne, Ind., assignor to The Magnavox Company, Fort Wayne, Ind.
Filed Apr. 1, 1966, Ser. No. 539,475
U.S. Cl. 336—130                                      3 Claims
Int. Cl. H01f 21/06

ABSTRACT OF THE DISCLOSURE

This invention pertains to a magnetic device in which the two magnetic components comprised of a core and inductive coil are mounted so that one can move relatively to the other on a gimbal so that one of the parts remains in a given plane while still being uniformly coupled to the other part.

---

The invention relates to a magnetically coupled core and coil arrangement and particularly to such an arrangement that permits the core to move relative to the coil without being touched or impeded by the coil.

In magnetic devices, for example, a sensor of the earth's magnetic field, it is frequently desirable or necessary that a magnetic core be maintained in a predetermined plane despite motions of the supporting structure. In the sensor example, this plane is horizontal, and the accuracy of the sensor depends to a large extent on the core remaining in the horizontal plane. In order that the core can be utilized, one or more windings must be magnetically coupled to the core. In prior devices, where the core preferably is or must be relatively light and small, the coils wound on and coupled to the core have introduced such an appreciable weight that the combined core and coil inertia cause the core and coil to follow the motions of the supporting structure instead of remaining in the predetermined plane. Also in these prior devices, the external leads from the coils have sufficient size and inertia so as to introduce a drag so that the core and coil follow the motions of the supporting structure instead of remaining in the predetermined plane.

Accordingly, an object of the invention is to provide an improved magnetically coupled core and coil arrangement.

Another object of the invention is to provide a magnetically coupled core and coil arrangement in which the core can remain substantially in a predetermined plane despite motion of the supporting structure.

Another object of the invention is to provide a magnetically coupled core and coil arrangement in which the coil does not add to the inertia of the core, and in which the coil leads do not add drag.

Another object of the invention is to provide a magnetically coupled core and coil arrangement in which the coil can be physically isolated from the core to permit the core to remain in a predetermined plane and at the same time can be symmetrically or uniformly magnetically coupled to the core.

Briefly, these and other objects are achieved in accordance with the invention by an arrangement having a main base. A universal joint or a set of gimbals has one of its two elements fastened to the base so that the one element and main base are free to move relative to the other of the two elements. The magnetic core is fastened to the other element in its predetermined plane but so that the base and one element can freely move without causing motion of the core. A coil or coils are mounted on the main base in magnetic proximity to but spaced from the core. Thus, the core can remain in its predetermined plane without being impeded by drag or inertia of the coil or coils and leads, despite motion of the main base. In one preferred embodiment the core is a toroid suspended in a horizontal plane, and the coils are positioned around the cross section of the toroid to provide a symmetrical and uniform magnetic coupling despite the movement of the coil and main base.

The invention may be better understood from the following description given in connection with the accompanying drawing; and the scope of the invention is pointed out in the claims.

Figure 1:
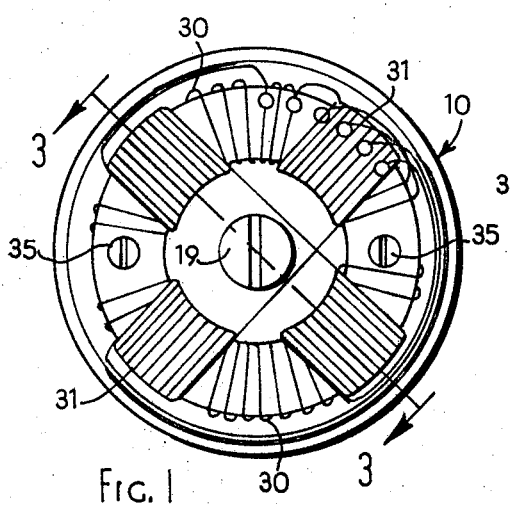
FIGURE 1 shows a top plan view of an arrangement in accordance with the invention, with the top cover removed.

The arrangement shown in the figures to illustrate the invention horizontally suspends a toroidal core to which one or more primary windings must be magnetically coupled and to which one or more secondary windings must be magnetically coupled. However, other arrangements of cores and coils may be utilized and come within the scope of the invention. The arrangement comprises a main base 10 having a cylindrical body 11 to which a circular top 12 and bottom 13 are fastened or attached to close the main base 10. The body 11, the top 12 and the bottom 13 may be made of any suitable nonmagnetic material such as a thermosetting plastic. Vertically positioned support or suspension means 15 in the form of a set of gimbals or a universal joint are provided. These support means 15 include a first element 16 which is attached to a second element 17 so that the two elements 16, 17 are free to pivot relative to each other with very little friction. Various types of such support means are known, and in the arrangement shown in the drawing these elements 16, 17 are joined by ball bearings 18 to provide the free pivotal movement between the two elements 16, 17. This particular type of support means is known as a miniature universal joint and is obtainable from the Falcon Machine and Tool Company, Inc., of North Wilmington, Mass. It is, of course, preferable, and in some cases essential, that the support means 15 be made of a nonmagnetic material such as brass. The first element 16 of the support means 15 is securely fastened to the top 12 by suitable means such as a machine screw 19 preferably of a nonmagnetic material. With the first element 16 so attached to the top 12, the second element 17 is free to move relative to the first element 16 and the main base 10. A magnetic core 21, shown in the figures as a toroid and made of any suitable magnetic material such as permalloy, is fastened or mounted on the second element 17 of the support means 15 so as to be positioned in a horizontal plane. This mounting or fastening of the core 21 is provided by a core support ring 22 formed of a suitable nonmagnetic material such as brass. The support ring 22 may be cemented or suitably fastened to the core 21. The support ring 22 is, in turn, supported by a pair of machine screws 23 which are made of a suitable nonmagnetic material such as brass, and which are symmetrically positioned relative to the support means 15 on a common diameter. (A different number such as three screws 23 positioned 120 degrees apart, may be used.) These machine screws 23 are threaded into a nonmagnetic plate 24 which is attached to the second element 17 through an extension 25 of the second element 17.

The extension 25 is suitably fastened to the second element 17 by any means such as threading. It will thus be seen that the main base 10, and specifically its top 12, supports the first element 16 of the support means 15, and the freely movable and pivotable second element 17 of the support means 15 supports the toroidal core 21.

In the embodiment shown, it has been assumed that one primary winding 30 and two sets of secondary windings 31 (each set having two windings) are coupled to the core 21. The primary winding 30 and the secondary windings 31 are wound on a toroidal coil form 32 made of suitable nonmagnetic material such as a plastic, the coil form 32 being horizontally divided into an upper portion 33 and a lower portion 34. The coil form 32 is divided into two portions 33, 34 to permit the core 21 and its supporting structure to be placed within the coil form 32. As seen particularly well in FIG. 3, the coil form 32 has sufficiently large internal cross-sectional dimensions so as to be well separated from the core 21 by the requisite distance. The coil form 32 is attached to the top 12 by any suitable means, such as nonmagnetic machine screws 35 and spaces 38. Thus, the coil form 32 with its windings 30, 31 is securely fastened to the main base 10 and moves therewith without disturbing or impeding the motion of the magnetic core 21. The lower portion 34 of the coil form 32 has openings 36 to permit the supporting machine screws 23 for the core 21 to pass therethrough and permit the core 21 to move freely. These openings 36 have sufficient clearance so that the structure permits a relatively large movement of the core 21 without hitting or being impeded by the coil form 32.

The windings, 30, 31 are wound on the coil form 32 in any desired fashion, in some cases it being preferable (as shown) that these windings 30, 31 be symmetrically arranged around and on the coil form 32. It is, of course, necessary that a compromise must be made as between the degree or tightness of coupling between the windings 30, 31 and the core 21, and between the freedom of movement of the core 21 within the coil form 32. However, the arrangement is very useful in many applications as long as the windings are magnetically coupled to or responsive to the core 21. The leads for the windings 30, 31 may be brought out in any suitable manner and connected to terminals if desired. There are six leads shown, two for the primary winding 30, and two for each of the two sets of secondary windings 31.

Figure 4:
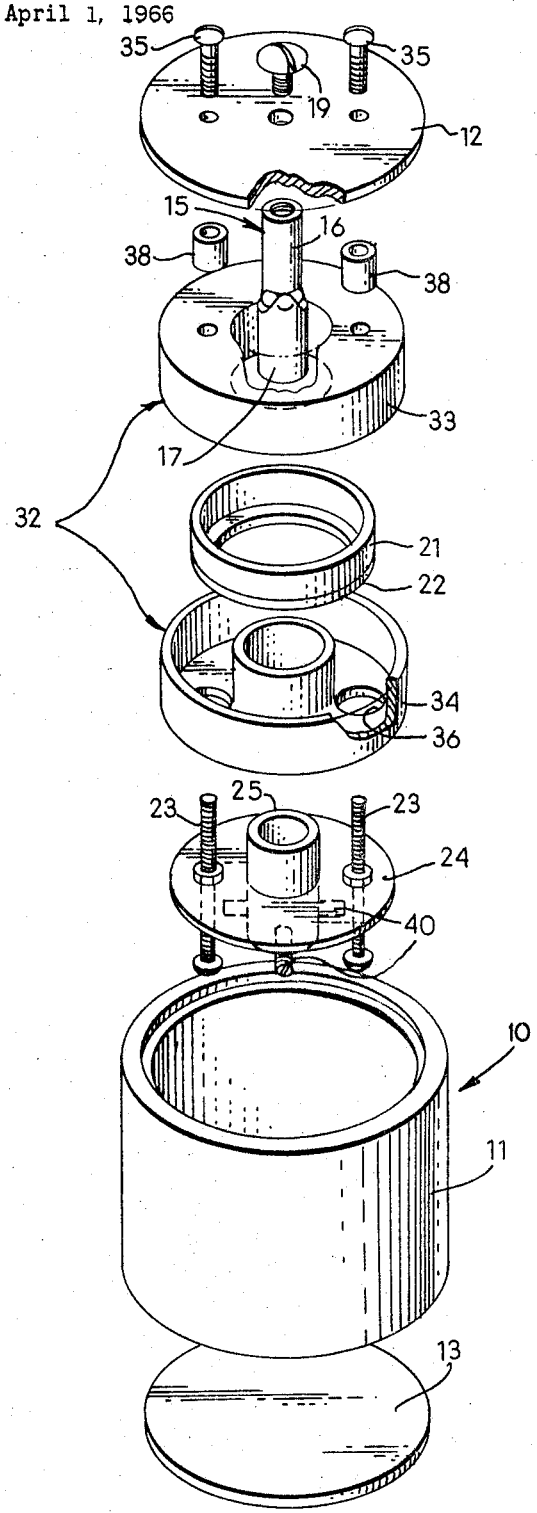
FIGURE 4 shows an exploded isometric or perspective view of the core and coil arrangement shown in FIGS. 1, 2 and 3.

In the assembly of the arrangement (and here reference to FIG. 4 is helpful), the core 21 and its attached ring 22 are placed in one of the portions 33, 34 of the coil form 32, and the other portion fastened thereto to complete the coil form 32 with the core 21 inside. The windings 30, 31 are wound on the coil form 32, making sure that the various openings, particularly the lower portion opening 36, are not covered. The coil form 32 and windings 30, 31 are then attached to the top 12 of the main base 10. Then the screws 23 on the second element plate 24 are fastened or threaded into the core support ring 22 to mechanically connect the core 21 to the plate 24 and the extension 25. Then, the extension 25 with the plate 24 and other elements is fastened to the second element 17 of the support means 15. And, finally, the support means 15 are attached to the top 12 of the main base 10. The top 12 may be fastened to the cylindrical body 11, and the device checked, particularly for the balance and orientation. If the core 21, the second element plate 24 and the extension 25 are not suspended so that the core 21 is in the predetermined plane, balancing screws 40 may be adjusted to shift the center of gravity of the movable structure to the desired position. Then, the bottom 13 may be attached to the main base 10 to complete the arrangement. Thus, a closed and sealed structure is provided which permits the structure with the coils to move and at the same time permits the core 21 to remain in its predetermined plane, in this case, the horizontanl plane.

Figure 5:
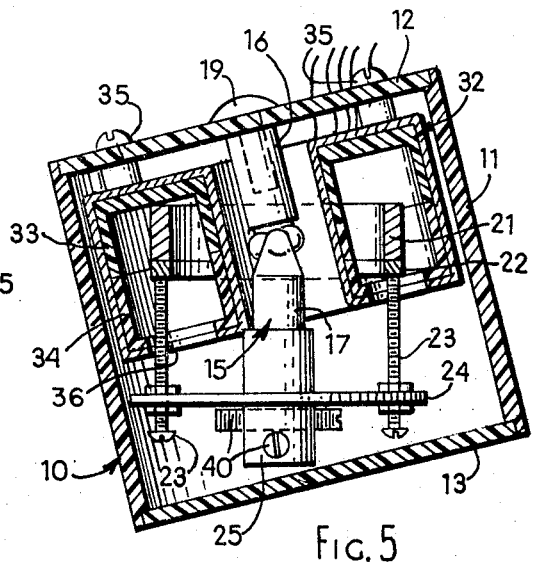
FIGURE 5 shows a cross-sectional view comparable to FIG. 3, but with the main base and coils tilted.
Figure 2:
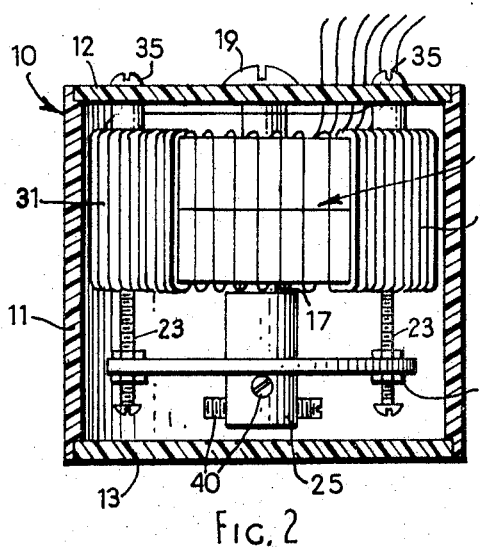
FIGURE 2 shows a side elevation of the arrangement of FIG. 1 with the side broken away for clarity.
Figure 3:
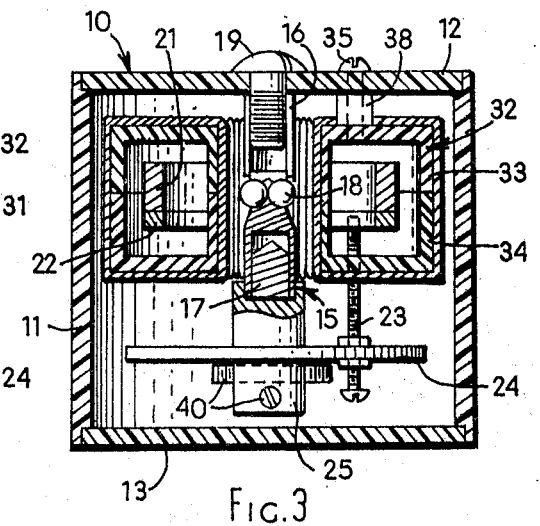
FIGURE 3 shows a cross-sectional view taken along the lines 3—3 of FIG. 1.

FIG. 5 shows a cross-sectional view corresponding to FIG. 3 (but taken along the diameter of the screws 23, 35), with the main base 10 and its attached elements tilted at an angle of approximately 15 degrees relative to the core 21. Until this angle is reached, no structure, other than the supporting structure, touches the core 21. Larger tilt angles without contact can be obtained by increasing the necessary clearances. It should be noted that the movement of the core 21 may be damped by any suitable means, such as placing an oil in the bottom of the main base 10 to damp the motion of the extension 25 and hence damp the motion of the core 21.

While the mechanical suspension of the core 21 as shown is preferred, it is possible to make the coil form 32 liquid tight, and fill it with a liquid on which the core 21 (with suitable buoyancy and protection) can be floated.

It will thus be seen that the invention provides an improved arrangement for coupling one or more coils or windings to a magnetic core so that the core can remain in substantially a predetermined plane despite motion of the supporting structure and coils. Further, the arrangement physically isolates the coil from the core so as to eliminate the coil weight and lead drag which was present on prior cores with coils wound directly thereon. If the coils are wound uniformly and symmetrically about the coil form, corresponding uniform and symmetrical magnetic coupling between the coils and core is provided. Persons skilled in the art will appreciate that modifications of the invention may be made. For example, other cores of other shapes may be utilized, and the cores may be suspended or mounted in different planes other than the horizontal plane illustrated. And, other support structures between the core and the second, movable element of the support means may be utilized in place of the second element extension 25 and the plate 24 and screws 23. Also, support means beside the universal joint shown and described, may be used. Such modifications, as well as others, will be apparent to persons skilled in the art. Therefore, while the invention has been described with reference to a particular embodiment, it is to be understood that modifications may be made without departing from the spirit of the invention or from the scope of the claims.

What I claim as new and desire to secure by Letters Patent of the United States is:

1. An improved magnetic drive comprising:
 (a) a main base for said device;
 (b) a support means having first and second associated elements one received within the other and which are movable relative to each other within limits so that said second element may remain in a predetermined position despite movement of said first element;
 (c) a magnetic core structure mounted on said second element of said support means for movement with said second element of said support means;
 (d) means mounting said first element of said support means on said main base;
 (e) and an inductive coil mounted on said main base in operative proximity to said magnetic core structure to respond to magnetic changes in said magnetic core structure, and spaced from said magnetic core structure and said second element of said support means to permit a predetermined amount of free movement of said magnetic core structure and said second element of said support means.

2. A magnetic device comprising:
 (a) a case;
 (b) gimbaled means having a base mounted on said case and a support attached to said base so that said support remains in a predetermined plane despite movement of said base and case;
 (c) a magnetic core mounted on said support for limited movement therewith;
 (d) and a coil mounted on said case adjacent to said magnetic core for sensing magnetic flux changes therein, said coil and core being proportioned to fit one within the other and positioned to permit limited movement of said core relatively to said support.

3. An improved magnetic drive comprising:
(a) a case;
(b) gimbaled means having a base portion mounted on said case and a support portion movably attached to said base portion so that said support portion remains in a predetermined position despite movement of said base portion and case;
(c) a toroidal magnetic core mounted on said support portion for movement therewith;
(d) and a coil wound about a coil form positioned about said toroidal core, said coil form being fastened to said case and being positioned so that said coil surrounds at least a portion of said magnetic core for sensing magnetic flux changes therein, said coil form being sufficiently large to encompass said core and permit limited movement of said core and support portion, and said coil form and coil being located relative to said core for symmetrically sensing flux changes therein despite relative movement of said case and said core.

References Cited

UNITED STATES PATENTS

| | | | |
|---|---|---|---|
| 1,950,216 | 4/1933 | Capps | 336—229 X |
| 2,790,119 | 4/1957 | Konet et al. | 74—5.6 X |
| 2,815,584 | 12/1957 | Watson | 74—5.6 X |
| 2,948,155 | 8/1960 | Burkam | 74—5.6 |
| 3,226,984 | 1/1966 | Humphrey | 74—5.6 |
| 3,277,706 | 10/1966 | Godet | 336—130 X |

LEWIS H. MYERS, *Primary Examiner.*

THOMAS J. KOZMA, *Assistant Examiner.*

U.S. Cl. X.R.

74—5.6

UNITED STATES PATENT OFFICE
CERTIFICATE OF CORRECTION

Patent No. 3,425,015 January 28, 1969

Herbert H. Klug

It is certified that error appears in the above identified patent and that said Letters Patent are hereby corrected as shown below:

Column 4, line 45 and column 5, line 3, "drive", each occurrence, should read -- device --.

Signed and sealed this 24th day of March 1970.

(SEAL)
Attest:

Edward M. Fletcher, Jr.
Attesting Officer

WILLIAM E. SCHUYLER, JR.
Commissioner of Patents